Nov. 6, 1934.  C. J. HALBORG  1,979,973
BROACHING MACHINE
Filed Feb. 12, 1931  4 Sheets-Sheet 1
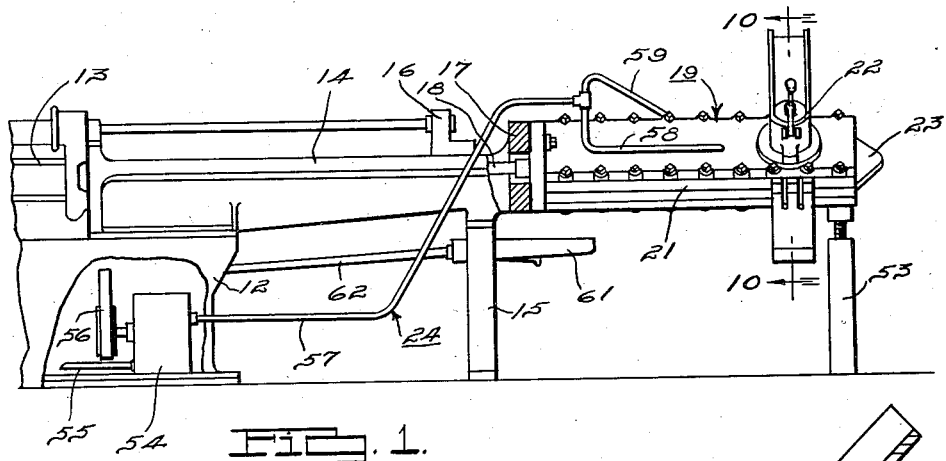
Fig. 1.
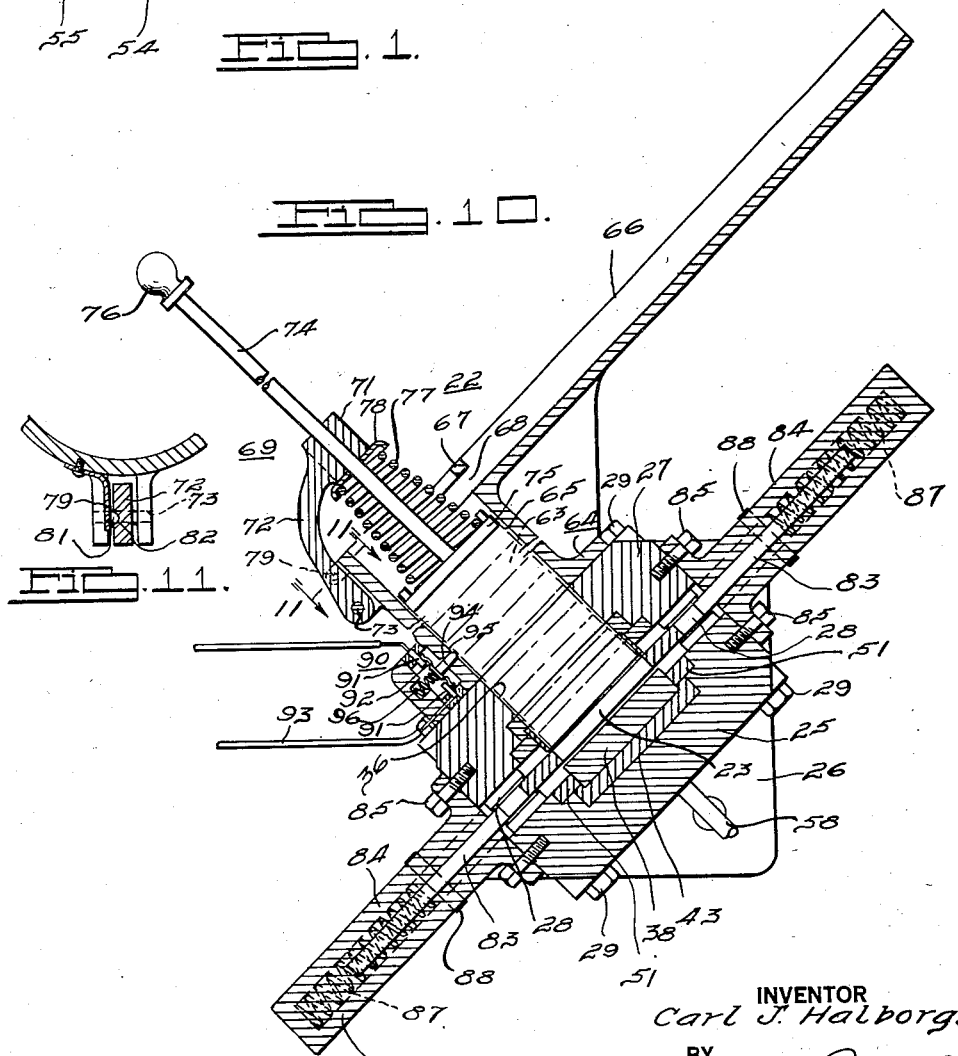
Fig. 10.
Fig. 11.
INVENTOR
Carl J. Halborg.
BY
Barnes, Dickey, Pierce & Mann.
ATTORNEYS.

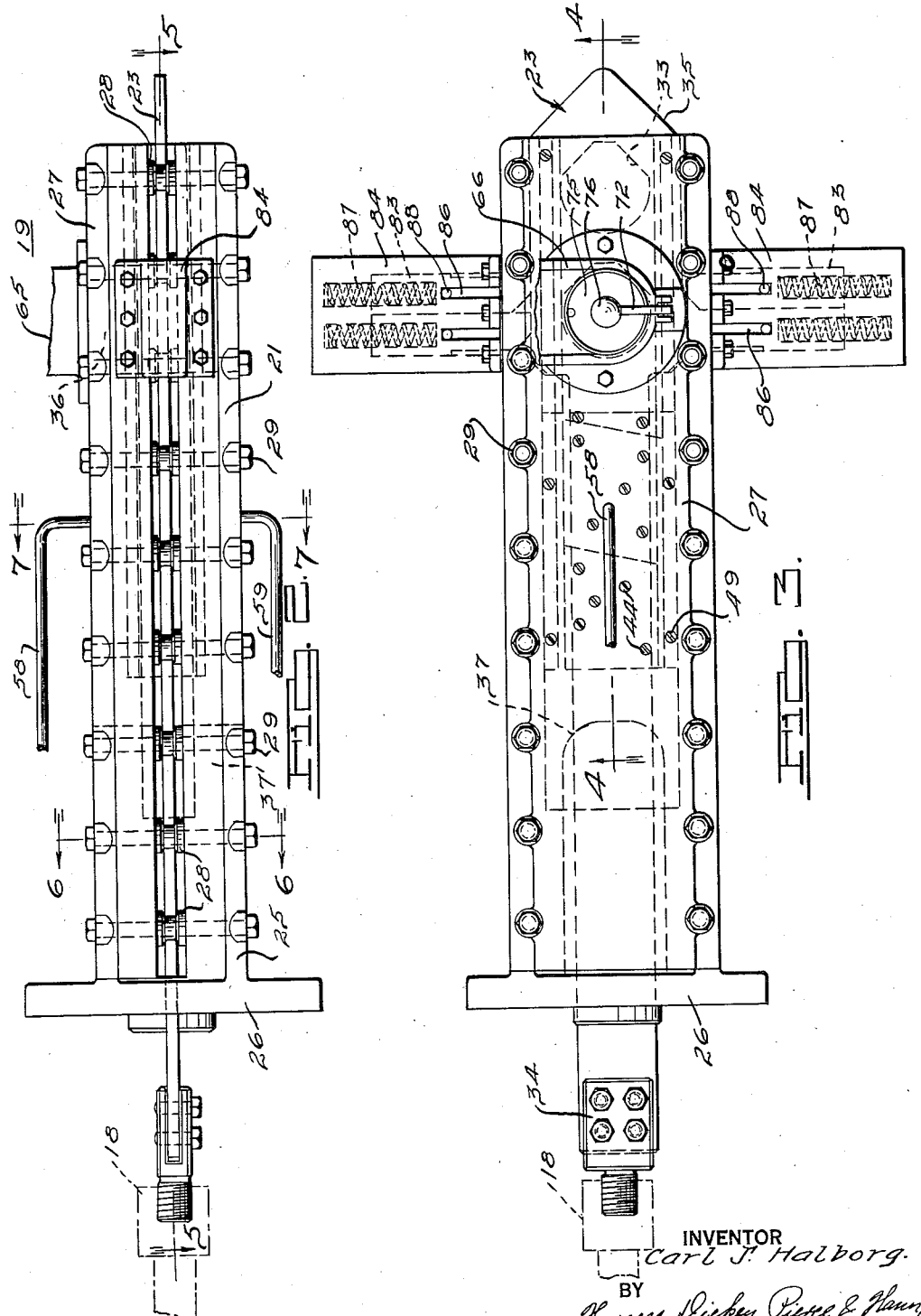

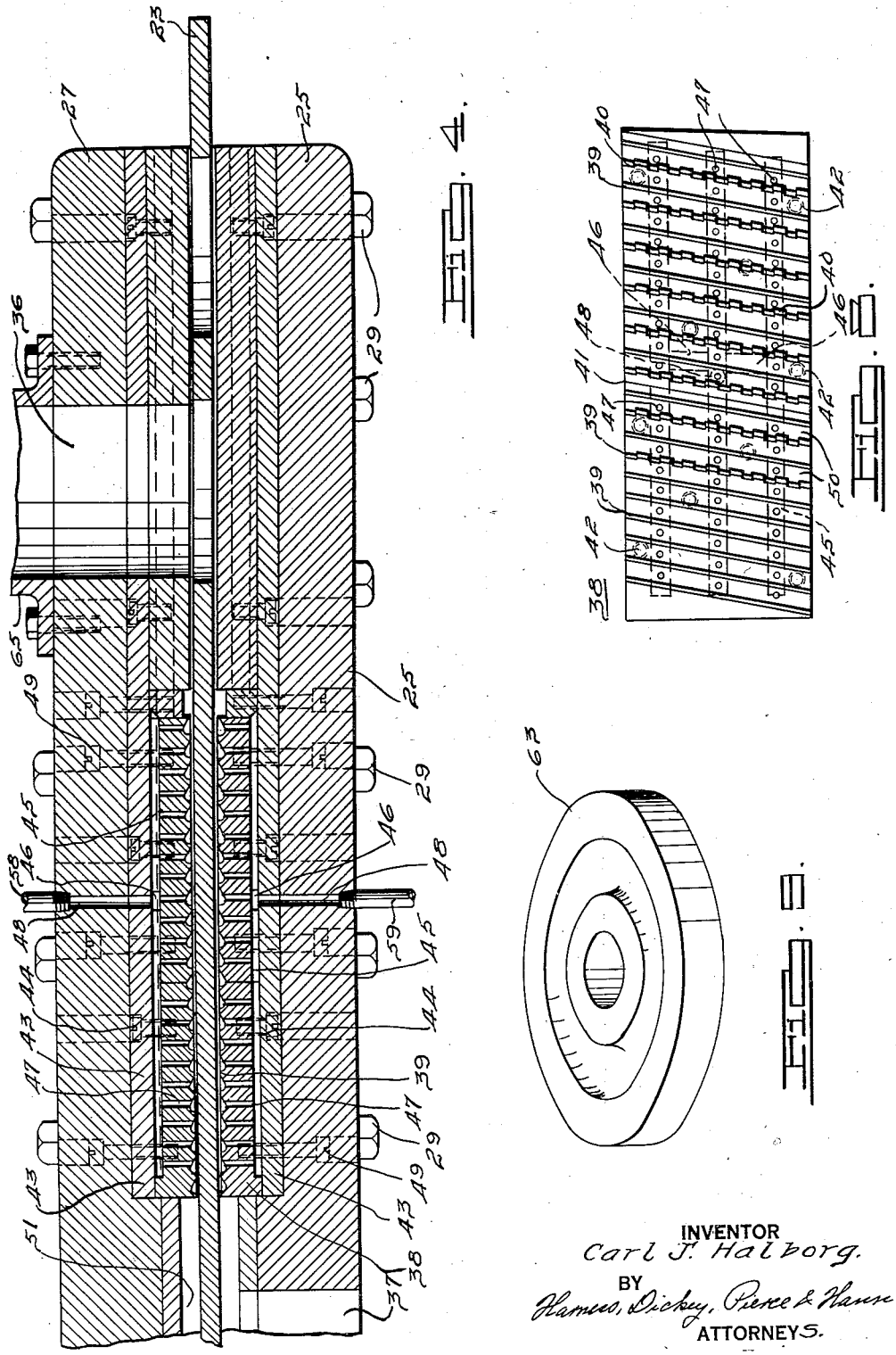

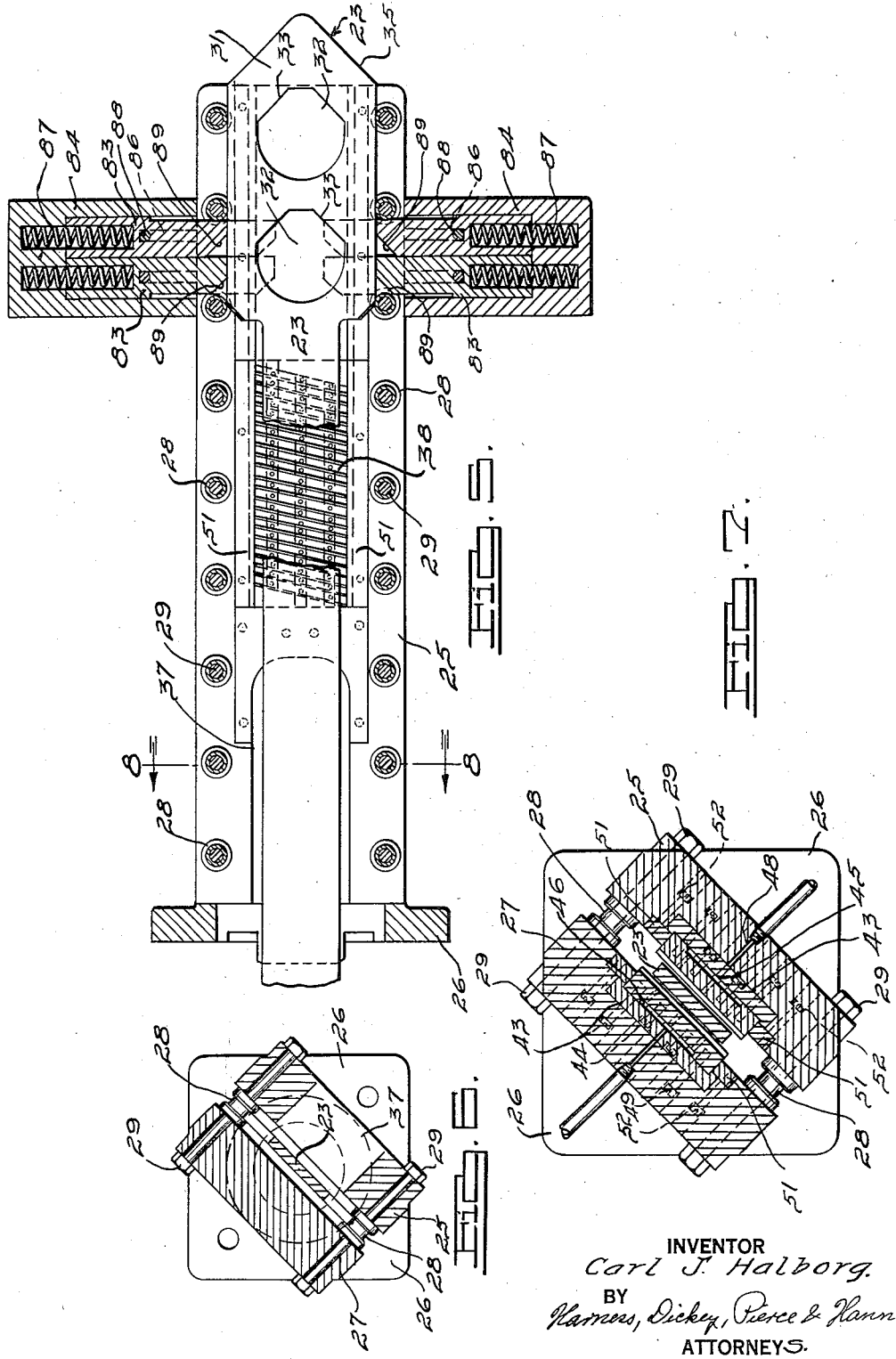

Patented Nov. 6, 1934

1,979,973

UNITED STATES PATENT OFFICE 1,979,973

BROACHING MACHINE

Carl J. Halborg, Detroit, Mich., assignor to Colonial Broach Company, a corporation of Michigan Application February 12, 1931, Serial No. 515,288

18 Claims. (Cl. 90—33)

My invention relates to broaching machines and particularly to a machine for facing and finishing opposite sides of flat work pieces such, for example, as gear blanks.

When manufacturing gears in quantity, it has been the custom to roughly machine the gear blanks on substantially its entire surface and thereafter finish the sides, to assure parallelism and accurate width, by a grinding operation.

A number of the blanks so finished were then clamped together and a milling cutter was employed to machine teeth on the outer periphery of the gear blanks thus assembled.

The machining and grinding operations, above described, were exceedingly expensive, entailing considerable time and a large number of machines to effect a mass production of the blanks having finished, parallel sides.

In practicing my invention, I eliminate the expensive machining and grinding operations by providing a machine which receives the gear blanks, as produced by a forging operation, and machine the sides to parallelism and exact width by a single rapid operation. A pair of broaching cutters are oppositely disposed within the machine and spaced apart a distance at the rear cutting edge which is equal to the thickness of the finished gear. Operating means are provided for receiving a gear blank in the rough and for drawing it between the cutters to thereby effect the machining of the sides of the blank.

A feeding device is provided for automatically delivering the blanks to the operating means or carrier, the under side of which is provided with fingers for rendering the device inoperative after the carrier has passed thereunder.

The broaching cutters are suported in the machine in such maner as to be inclined longitudinally of their length to permit the cuttings to fall from between the teeth by gravity alone. In order, however, to make doubly sure that the chips are constantly being freed from between the teeth I provide a hydraulic system for effecting a flow of oil, or other fluid to a receptacle provided on the back surface of the cutter from which the fluid flows through a plurality of apertures into the space between the teeth. The fluid is not only beneficial for the purpose of carrying the cuttings from between the teeth but is also advantageous in providing a lubricant to the teeth and also for cooling its cutting edges.

The cutters are each provided in a plurality of sections having upstanding teeth thereon, some of which are notched for the purpose of breaking up the cuttings into short lengths which readily passes from between the teeth. The teeth vary in height from the front, or gear blank receiving end, to the rear, a plurality of the rearly disposed teeth being at substantially the same height varying only slightly in length from each other in order to effect a finished surface to the blank after passing between the cutters.

Accordingly, one object of my invention is to provide a machine with oppositely disposed cutters between which the sides of a gear blank is accurately machined.

Another object of my invention is to provide a feeding device which forces a gear blank into a carrier and which locks the remaining blanks within the carrier after the carrier has passed from under the device and with additional means for shutting down the machine when only a predetermined number of gear blanks remain within the feeding device.

A still further object of my invention is to provide retaining means for broaching cutters which readily permit their removal and insertion within the machine and which support the cutters in a plane inclined to the horizontal for the purpose of permitting the cuttings to drop therefrom and also provide the cutters with a hydraulic system which circulates fluid through the passages between the cutting teeth to further assure that the cuttings are removed therefrom and, when the fluid thus employed is a lubricant, to be of further advantage in lubricating the teeth and also in cooling them.

A still further object of my invention is to provide a carrier for gear blanks which extend between the cutters, which is provided with one or a plurality of self centering gear blank receiving openings, which is supported from the gear teeth by guides, which is provided with operating means whereby the blank receiving opening of the carrier passes under the feeding device to receive a blank or a plurality thereof and which passes over an aperture after being drawn between the cutters to deliver the machined blanks to a receptacle.

Numerous other objects and features of novelty of my invention will be either specifically pointed out or will become apparent when referring, for a better understanding of my invention, to the following description in conjunction with the drawings, wherein:

Fig. 1 is a broken view, partly in section and partly in elevation, of a broaching machine embodying features of my invention, Fig. 2 is an enlarged broken view, in angular elevation, of a broaching head embodying features of my invention, Fig. 3 is a broken plan view of the structure shown in Fig. 2, Fig. 4 is an enlarged, broken sectional view of the structure shown in Fig. 3 taken along the line 4—4 thereof, Fig. 5 is a sectional view of the structure shown in Fig. 2 taken along the line 5—5 thereof, Fig. 6 is a sectional view of the structure shown in Fig. 2 taken along the line 6—6 thereof, disclosing the angular position of the head when mounted on the machine, Fig. 7 is a sectional view of the structure shown in Fig. 2 taken along the line 7—7 thereof after the head has been mounted on the machine, Fig. 8 is an enlarged face view of one set of broaching cutters embodying features of my invention, Fig. 9 is a perspective view of a work piece, the machining operation of which is accomplished by my machine, Fig. 10 is an enlarged sectional view of the feeding device of the machine illustrated in Fig. 1, taken along the line 10—10 thereof, and, Fig. 11 is an enlarged, broken sectional view of the structure shown in Fig. 10, taken along the line 11—11 thereof.

Referring particularly to Fig. 1, my broaching machine comprises in general, a base 12 upon the rear portion of which a reciprocable operating mechanism 13 is supported which may be of the hydraulic or mechanical type, the particular construction of which is well known in the art and is not herein described or illustrated as it forms no part of my present invention. A cradle 14 is supported at its rear end on the base 12 adjacent to the operating mechanism 13 and is supported on its front end by means of the supporting legs 15.

The cradle is provided with runways upon which a head 16 is mounted in slidable engagement therewith and is connected to the operating mechanism 13 which effects its reciprocation. A centrally apertured head stock 17 is provided on the front end of the cradle 14, the aperture of which registers with a retaining bar 18 which extends frontwardly of the head 16. Suitable means (not shown) are employed to control the operation of the mechanism whereby the head 16 is automatically reciprocated in the carriage 14, from one end thereof to the other, a regulatable number of times per minute without requiring the attention of an operator. The apparatus mentioned above, is that conventionally employed in the art and will not be further described.

Projecting from the front portion of the headstock 17 is mounted my broaching fixture 19 comprising a body portion 21, an automatic feeding device 22, a carrier or pull bar 23, a hydraulic system 24 which will now be described in detail.

Referring more particularly to Figs. 2 to 7 inclusive, the body portion 21 of my broaching fixture 19 is provided with a bottom portion 25 having the mounting head 26 on its rearwardly disposed end and a top portion 27 which is mountable on the bottom portion. A plurality of guiding collars 28, in the shape of spools, space the top and bottom portions from each other when clamped together by means of bolts 29 which extend through the collar. An opening is thereby provided between the top and bottom portion through which the bar 23 extends.

The pull bar or carrier 23, shown more clearly in Fig. 5, comprises an enlarged end portion 31 of such width as to abut against the face of the central portion of the guiding collars 28 and to thereby be supported midway between the top and bottom portions of the fixture. Openings 32 are provided in the enlarged portion of the pull bar in which the work pieces or gear blanks are received and centered within the opening by the sloping sides 33 thereof. It is to be understood that any number of openings may be provided in the pull bar, the number depending upon the length of the reciprocable stroke and the power in the driving mechanism.

The narrower portion of the pull bar extends entirely through the fixture and the mounting portion 26 thereof and is provided with an adapter 34, shown in Figs. 2 and 3, on its rearmost end which extends through the apertures in the head stock 17 and is connectable to the retaining bar 18 of the operating mechanism. The front end of the pull bar 23 is provided with sloping sides 35 for a purpose which will be described more fully hereinafter.

The front end of the top portion 27 of the fixture is provided with an opening 36 through which the work pieces are delivered to the opening 32 of the pull bar 23 and an opening 37 is provided in the rear end of the bottom portion 25 of the fixture, through which the finished work pieces are delivered by the pull bar at the end of its stroke.

Medial of the fixture, a set of broaching cutters 38 are provided as illustrated in Figs. 4, 5, 7 and 8. From Fig. 8 it will be noted that the cutters are of rectangular shape and are provided with a plurality of upstanding teeth 39 which are of increasing height from the front to the rear end thereof, more clearly shown in Fig. 4. The alternate teeth in the central and front portion of the cutters are notched as at 40 for the purpose of cutting grooves in the work piece which break up the continuity of the cuttings produced by both sets of teeth. When the cuttings are thus broken up into short lengths they readily fall from between the teeth when the fixture is mounted in a manner which will be described hereinafter.

The continuity of a plurality of teeth at the rear portion of the broach is retained, as shown in Fig. 8 and varies only slightly in length toward the rearmost teeth, as shown in Fig. 4, for the purpose of providing a finish to the side of the work piece as it passes between the rear portion of the broach. The broach is divided into two sections at 41 to permit the renewal of either section for the purpose of being ground, repaired or being substituted for by another section in case the one section has become permanently damaged or worn out.

The front section is subjected to the greatest wear, being that portion which roughs off the greatest amount of material and for this reason will become dull sooner than the rear section and will require a sharpening operation oftener than the rear section. The teeth are disposed diagonally to the movement of the work piece for the purpose of increasing the life and reducing the strain on the individual teeth.

Mounting holes 42 are provided in the body portion of the broach by means of which it is attached to a supporting member 43 by means of bolts 44, as shown in Figs. 4 and 7. Channels 45 are provided in the rear body portion of each of the broaching cutters which are provided with a cross channel 46 to interconnect the three channels 45, as shown in Fig. 8. The channels are in direct communication with apertures 48 provided in the top and bottom portions 27 and 25, respectively, of the fixture and through the supporting means 43 of the broaching cutter. A plurality of apertures 47 connect the channels 45 with the grooves 50 between the teeth 39. The purpose of the channels and the apertures will be more fully described hereinafter.

The supporting members 43 for the cutters are retained on the inner face of the top and bottom portions 27 and 25 of the fixture by means of bolts 49 and side bracing members 51 are supported flush with the inner surface of the top body portion by means of bolts 52. In this construction, the broaching cutters 38 are rigidly supported on the inner surface of the fixture, in oppositely disposed relation, in such manner that the cutters are removable from the fixture without the necessity of disassembling the fixture. The removal of the bolts 52 and 49 releases the members 51 and 43 which may be removed from the top and bottom portions 27 and 25 of the fixture and the broaching cutters 38 thereafter removed from the member 43 for a sharpening or other operation.

A second set of broaching cutters are provided with my machine which may be immediately assembled upon the member 43 and adjusted in proper relation thereto by means of shims, or other adjusting means, to project a proper distance above the bottom of the supporting member 43. The members 43 and 51 are then assembled on the inner surface of the fixture as shown in Figs. 4 and 7 and the machine is again ready for operation. It is readily apparent that removal and installation of a new set of broaching tools is a simple operation requiring the machine to be shut down only a very short length of time.

From Figs. 1, 6, 7 and 10, it will be noted that the mounting head 26 is disposed in angular relation to the top and bottom body portions 27 and 25, respectively, and that when the mounting head 26 is supported on the head stock 17 the fixture will be retained thereon with the top and bottom portions 27 and 25 and therefore the broaching cutters 38, disposed in angular relation to the horizontal plan, preferably at a 45 degree angle thereto. The outer end of the fixture is steadied and supported by means of the supporting jack 53 illustrated in Fig. 1. By having the broaching cutters tilted at an angle the short chips cut from the work piece by the teeth will readily fall from the recesses therebetween by gravity.

As a further precaution to prevent the clogging of the teeth, by the chips I provide the hydraulic system 24, above referred to, which comprises a pump 54, which is connected to a suitable reservoir (not shown) by a conductor 55, and which is actuated by means of a pulley and belt 56 which is operated by a suitable mechanism (not shown). A fluid delivery conductor 57 is connectable by means of the extensions 58 and 59 to the apertures 48 provided in the top portion 27 and the bottom portion 25, respectively of the fixture.

The fluid thus provided to the apertures 48 passes through the channels 46 and 45 in the broaching cutters 38, and is forced through the plurality of apertures 47 communicating with the recesses between the teeth. The flow of the fluid along the recesses carry the cuttings therewith to thereby assist gravity in ejecting the cuttings from between the teeth. It is considerably important that the cuttings be quickly removed from the recesses as it is readily apparent that a collection of the cuttings between the teeth would render the cutters inoperative and may cause considerable damage to my machine.

I prefer to use oil or any other lubricant as the fluid which is supplied to my broaching cutter 38 for the purpose of lubricating the teeth to increase the life of the cutting edges. A further advantage of the fluid is in the cooling of the teeth which enables my machine to be operated at an exceedingly high rate of speed without danger of damaging the cutting edges because of heat. The liquid flows from between the top and bottom portions of the fixture into a receiving trough 61 provided therebelow into which the finished work pieces drop through the openings 37.

The fluid is drained from the trough by a conductor 62, illustrated in Fig. 1, from which it flows into the reservoir. Suitable screening means is provided at the mouth of the conductor 62 to prevent the chips, which fall into the trough, from being carried to the reservoir. In the fluid system thus provided, it will be noted that the same fluid is continually employed in the system, the reservoir being of sufficient size so as to prevent the excess heating of the fluid which would otherwise occur because of its too repeated passage through the broaching cutters.

In order to facilitate the loading of the work pieces in the pull bar 23 I have provided an automatic feeding device 22 which is illustrated in Figs. 1, 10 and 11. As pointed out hereinabove the work piece is a gear blank which is shown enlarged in Fig. 9 as being formed into the shape illustrated by a forging, molding or other operation having a thickness which conforms to predetermined limits in dimension. A housing 64 is attached to the outer top surface of the top portion 27 of the fixture and is provided with a hollow cylindrical extension 65 of a diameter conforming to the diameter of the gear blank 63, being slightly larger for permitting the blank to readily pass therethrough. The housing is so mounted on the top portion 27 of the fixture so as to be in extended relation with the opening 36 thereof.

A trough 66 is provided at right angles to the top portion of the extension 65 in which a plurality of the gear blanks may be disposed, in longitudinal relation with each other, from which they are passed into the cylindrical extension 65 by an operator at predetermined intervals. The mouth of the trough 66, adjacent to the cylindrical extension, is provided with a cross member 67 having a space 68 between its under surface and the bottom of the trough of a height equal to the maximum thickness of a gear blank 63 which may be received between the cutters 38. This arrangement provides an automatic gage by means of which gear blanks, which are of too great thickness, are prevented from passing to within the cylindrical extensions 65 and only gear blanks which are capable of being received between the cutters are permitted to be delivered to the pull bar 23.

It will be noted that the cylindrical extension 65 is disposed at an angle of substantially 45 degrees to the horizontal and for this reason the blanks will not be urged uniformly by gravity alone, to drop into the openings 32 provided in the pull bar. To prevent the cocking of the gear therein, I have provided an actuating mechanism 69 for the top portion of the extension 65 which constantly urges the gear blanks downwardly with a uniform pressure.

The actuating mechanism comprises a bearing 71 having an arm 72 thereon which is mounted on the side of the extension 65, in pivotal relation thereto, by a pin 73. A rod 74 extends through the bearing 71 and is provided with a plate 75 on its lower end and a knob 76 on its upper end which when engaging the bearing 71, limits the travel of the plate 75 to within a predetermined distance of the pull bar.

A spring 77 is provided between the plate 75 and a plate 78, disposed on the under side of the bearing 71 for the purpose of urging the plate 75 downwardly throughout all of its positions within the cylindrical extension 65. A locking arm 79, shown more clearly in Fig. 11, is provided on the outer surface of the extension 65 having a projection 81 thereon which engages a recess 82 provided in the arm 72 for the purpose of retaining the arm in locked relation to the extension.

To prevent the gear blank 63 from being biased downwardly after the pull bar has passed therewithunder, I have provided a plurality of fingers 83, shown more clearly in Figs. 5 and 10, which project inwardly after the bar has passed under the opening 36 to retain the gear blanks within the cylindrical extension. Housings 84 are mounted in oppositely disposed relation, opposite to the opening 36 in such manner as to span the space between the top and bottom portions 27 and 25 of the fixture and are supported thereon by bolts 85. Slots 86 are provided in the body portion of the housing 84, the inner portion of the housing being hollow for the purpose of receiving the fingers 83 and springs 87 which are employed for urging the fingers outwardly therefrom. Pins 88 are retained in the body portion of the fingers 83 which extend either side thereof to register in the slots 86 for the purpose of limiting the travel of the fingers.

The fingers are more clearly shown in Fig. 5 as being provided with a sloping surface 89 on their front ends which are substantially of the same degree as the sloping surfaces 35 provided on the front end of the pull bar 23. As the pull bar is drawn rearwardly past the fingers, the fingers move inwardly as the sloping surfaces 35 are engaged by the sloping surface 89 of the fingers, to a position shown in dotted lines in Fig. 5, to register directly under the opening 36, below the feeding device 22, for retaining the columns of blanks within the cylinder extension 65. Upon the return stroke of the pull bar the surfaces 35 engage the surfaces 89 of the fingers and force the fingers laterally into the housings 84 against the bias of the springs 87.

During the return stroke, a gear blank is forced into each of the openings 32 by the feeding device 22 and the pull bar 23 is again ready to be reciprocated. A plurality of the fingers 83 are employed, in order that they may progressively move under the opening 36 to provide double assurance that, immediately upon the passage of the bar 23 from under the openings the fingers will receive and retain the gear blanks within the extension.

It is to be understood that the extension is of considerable length and is shown herein as broken in order that an enlarged view of the structure could be illustrated. For this reason the influence of the spring 87 is considerably weakened at the bottom portion of the extension and when this condition arises there is danger of the cocking of the gear blanks in the openings 32 which might considerably damage the machine as pointed out above. For this reason, a device is attached to the extension for shutting down the machine in case the number of blanks in the extension is reduced below a predetermined number.

Any device well known in the art to be suitable for this purpose may be employed and I have shown in Fig. 10, for the purpose of illustration, a switch 90 which is provided with a pair of contacts 91 to which a circuit to the motor or other operating controlling device is connected. The contacts 91 are bridged by a conducting bar 92 which is carried by a plunger 94 which extends through an opening 95 in the wall of the extension 65. The plunger and the contact bar are biased forwardly, out of engagement with the contacts 91, by a spring 96 which forces the plunger 94 to within the hollow opening of the extension 65.

During the normal operation, the side walls of the gear blanks 63, within the extension 65 engage the end of the plunger 94 and prevents it from moving inwardly into the extension and thereby forces the conducting bar 92 into bridging contacting relation with the contacts 91 against the bias of the spring 96.

The bridging bar is herein shown as being of the spring type to permit the circuit 93 to be retained completed at the time the plunger 94 has moved a short distance inwardly within the extension. Contact is thereby retained between the bridging bar 92 and the contacts 91 when the plunger is moved inwardly due to variation in the diametrical dimension of gear blanks. When the column of blanks has been reduced below a predetermined number, the passage of the plates 75 therebeyond permit the plunger to move inwardly to thereby completely break the circuit 92 and shut down the machine before any damage ensues thereto.

The operation of my machine will now be described. A plurality of the blanks are first loaded in the tray 66 and the actuating member 69 is drawn upwardly and swung out of the hollow portion of the extension about the pivot 73. The blanks 63 are then slid under the cross member 67 to assure that the thickness thereof is less than a predetermined dimension and the extension is thereby filled with a plurality of the gear blanks. The actuating mechanism is then swung upwardly about the pivot to have the plate 75 thereof register with the top surface of the topmost blank in which position the actuating mechanism is retained, by the engagement of the projection 81 with the recess 82, in locked relation with the extension. The operating mechanism is then actuated to effect the reciprocation of the pull bar 23 and the rotation of the pulley and belt 56 as hereinbefore explained.

The passage of the pull bar beneath the feeding device 22 causes gear blanks to be delivered to the openings 32 therein which are drawn between the broaching cutters 38 for machining both sides thereof into parallelism and for finishing the side surfaces after which the blanks are dropped from the opening 37 into the trough 61.

As the blank receiving end of the pull bar passes from under the feeding device 22, fingers 83 on the side thereof are forced outwardly to engage the under surface of the lowermost blank to retain the blanks within the feeding device. The pull bar upon delivering the finished blanks to the trough at the end of a stroke is automatically reciprocated to its original position during which reciprocation, the fingers 83 are biased from under the feeding device and two more blanks are delivered to the opening 32. The machine automatically operates in this manner continuously passing through the above mentioned cycle.

During the machining operation a fluid is delivered to the channels, provided in the back portion of the cutters, which flows to within the recesses between the cutting teeth for washing the chips from the recesses. The cutters are tilted in a plane of substantially 45 degrees to the horizontal to permit the chips to fall by gravity out from within the recesses.

The fluid is preferably a lubricant which increases the longevity of the cutting surfaces of the teeth by cooling and lubricating them. The presence of the cooling and lubricating fluid not only increases the life of the broaching cutter but also materially increases the speed with which the broach may be operated. With the machine above described the gear blanks have been cut at a rate greater than 100 per minute and it is very apparent that a material saving in time and cost ensues when my machine is employed for finishing the sides of gear blanks.

It will thus be seen that I have provided a machine for finishing and paralleling the sides of a gear blank or similar work pieces which is automatically and continuously operated and which machines the sides of the work pieces with great accuracy and rapidity. The broaching cutters are provided in section so that if either portion becomes damaged a new portion may be substituted therefor without entailing the expense of buying a complete broaching tool. The adjacent rows of teeth are notched for the purpose of breaking up the chips which fall from between the broaching cutters because of the angle in which they are mounted, being disposed in a plane substantially 45 degrees to a horizontal.

The life of the broaching cutter is exceedingly lengthened by the application of a lubricant and cooling fluid to the cutting portions thereof, which aids materially in washing the chips from within the recesses between the teeth and in permitting a high speed operation of the machine.

The broaching cutters are mounted on each face of the oppositely disposed portions of the fixture in such manner that they may be readily removed and a new set substituted therefor without the necessity of tearing down the machine or shutting it down for any material length of time.

The feeding device employed on the machine provides a constant bias to the blanks for urging them uniformly into the recesses of the pull bar. The device is provided with a gage for measuring the thickness of each of the gear blanks to eliminate the possibility of a gear blank of too great thickness being delivered to the pull bar which would damage the machine and the teeth of the broaching cutter.

While I have described and illustrated but a single embodiment of my invention, it will be apparent to anyone skilled in the art that many changes, omissions, additions and substitutions may be made therein without departing from the spirit and scope of my invention as set forth in the accompanying claims.

I claim as my invention:

1. The combination with a body portion of a broaching machine, of a broaching cutter disposed thereon, a pull bar provided with a work receiving opening, means for retaining said pull bar in predetermined relation to said cutter, means for actuating said pull bar to move the work piece across said cutter, and means for feeding said work pieces into said opening.

2. The combination with a body portion of a broaching machine, which includes two members in fixed relation and spaced from each other by notched members, of broaching cutters oppositely disposed on the inner surface of said members, a pull bar provided with a work receiving opening and with notch engaging portions and a reciprocable actuating mechanism in connected relation to said pull bar, and means for delivering work pieces to said opening.

3. The combination with a body portion of a broaching machine, which includes two members in fixed relation, of guides for spacing said members, broaching cutters oppositely disposed on the adjacent surfaces of said members, a pull bar provided with a work receiving opening on one of its ends in which a workpiece may be nested to extend on either side of said bar, means for spacing and supporting said bar between said cutters, and a reciprocable actuating mechanism engaging said pull bar for effecting its reciprocation.

4. The combination with a body portion of a broaching machine, which includes two members in fixed relation, of guides for spacing said members, broaching cutters oppositely disposed on the adjacent surfaces of said members, a pull bar of greater width than the cutters and of less thickness than the space therebetween provided with a workpiece receiving opening and supported on said spacing guides and a reciprocable actuating mechanism engaging said pull bar for effecting its reciprocation.

5. The combination with a body portion of a broaching machine which includes two members in fixed spaced relation, of guides spacing said members, broaching cutters oppositely disposed on the inner surfaces of said members at an angle of substantially 45 degrees with a horizontal plane, a pull bar between said cutters provided with a work piece receiving opening and with guide engaging surfaces on one end and a reciprocable actuating mechanism attached to the other end of said pull bar for effecting its reciprocation.

6. The combination with a body portion of a broaching machine which includes two members in fixed spaced relation, of guides for spacing said members, a pull bar supported on said guides and provided with work receiving openings, broaching cutters oppositely disposed on the adjacent surfaces of said member in predetermined spaced relation, an actuating mechanism for reciprocating said pull bar between said cutters and a feeding device for automatically supplying work pieces to said work receiving openings.

7. The combination with a body portion of a broaching machine which includes two members in fixed spaced relation, of guides for receiving said member, a pull bar supported in said guides and provided with a plurality of work receiving means, broaching cutters oppositely disposed on the adjacent surfaces of said member in predetermined spaced relation, an actuating mechanism for reciprocating said pull bar between said cutters and a feeding device for automatically delivering work pieces to said work receiving means.

8. The combination with a body portion of a broaching machine which includes two members in fixed spaced relation, of guides for spacing said member, a pull bar supported in said guides and provided with work receiving recesses, a broaching cutter disposed on an inner surface of said member adjacent to said plane of movement of said recess in predetermined spaced relation to said bar, an actuating mechanism for reciprocating said pull bar to have the recess thereof passed across said cutter and a feeding device for automatically delivering a work piece to said work receiving recess.

9. The combination with a body portion of a broaching machine which includes two members in fixed spaced relation, of guides for spacing said member, a pull bar supported on said guide and provided with a work receiving opening, broaching cutters oppositely disposed on the adjacent surfaces of said member in predetermined spaced relation, an actuating mechanism for reciprocating said pull bar between said cutters, a feeding device for automatically supplying work pieces to said work receiving opening, and means for removing the workpiece from the receiving opening toward the end of the stroke of the pull bar.

10. The combination with a body portion of a broaching machine with includes two members in fixed relation, of guides for receiving said member, a pull bar supported in said guides and provided with a plurality of work receiving recesses, broaching cutters oppositely disposed on the adjacent surfaces of said member in predetermined spaced relation, an actuating mechanism for reciprocating said pull bar between said cutters, a feeding device for automatically delivering work pieces to said work receiving recesses and means for receiving said work piece which drop from the receiving recesses at substantially the end of the pull bar stroke.

11. The combination with a body portion of a broaching machine which includes two members in fixed spaced relation, of guides for spacing said member, a pull bar supported in said guides and provided with a work receiving recess, a broaching cutter disposed on an inner surface of said member opposite to said plane of movement of said recess in predetermined spaced relation to said bar, an actuating mechanism for reciprocating said pull bar to have the recess thereof passed across said cutter, a feeding device for automatically delivering a work piece to said work receiving recess, said work piece dropping from said recess at the end of the stroke to permit the return of said pull bar to the feeding device.

12. The combination with a body portion of a broaching machine which includes two members in fixed spaced relation, of guides for spacing said members, a pull bar supported on said guides and provided with work receiving recesses, broaching cutters oppositely disposed on the adjacent surfaces of said member in predetermined spaced relation, an actuating mechanism for reciprocating said pull bar between said cutters, a feeding device for automatically supplying work pieces to said work receiving recesses, and hydraulic means for delivering a fluid to the cutters for cooling and lubricating the cutting teeth thereof.

13. The combination with a body portion of a broaching machine which includes two members in fixed spaced relation, of guides for receiving said member, a pull bar supported in said guides and provided with a plurality of work receiving openings, broaching cutters oppositely disposed on the adjacent surfaces of said member in predetermined spaced relation, an actuating mechanism for reciprocating said pull bar between said cutters, a feeding device for automatically delivering work pieces to said work receiving opening, and hydraulic means for delivering a fluid to the cutters for cooling and lubricating the cutting teeth thereof.

14. The combination with a body portion of a broaching machine which includes two members in fixed spaced relation, of guides for spacing said members, a pull bar supported in said guides and provided with work receiving recesses, a broaching cutter disposed on an inner surface of said member adjacent to said recess and in predetermined spaced relation to said bar, an actuating mechanism for reciprocating said pull bar to have the recess thereof passed across said cutter, a feeding device for automatically delivering a work piece to said work receiving recess, said work piece falling from said opening at substantially the end of the stroke of said pull bar and hydraulic means for delivering a fluid to the cutter for cooling and lubricating the cutting teeth thereof.

15. The combination with a pull bar for drawing a work piece across the face of a cutter, of a feeding device for automatically delivering a work piece to said bar, means for preventing the delivery of a work piece to said feeding device having a thickness greater than a predetermined dimension and means for preventing the delivery of a work piece after the pull bar has cleared the device.

16. In combination, a feeding device for automatically delivering a work piece to a pull bar of a broaching machine, including a receptacle for a plurality of said work pieces, a biasing device for forcing said work pieces downwardly against said pull bar, means for supporting said work pieces in said receptacle against downward movement when said pull bar has cleared said feeding device and means actuated when said work pieces in the receptacle have been reduced below a predetermined number for shutting down said machine.

17. In combination, a feeding device for automatically delivering a work piece to a pull bar of a broaching machine including a receptacle for a plurality of said work pieces, a biasing device for forcing said work pieces downwardly against said pull bar, a receptacle filling means provided with means for preventing a work piece of too great thickness entering said receptacle and means actuated when said work pieces in the receptacle have been reduced below a predetermined number for shutting down said machine.

18. The combination with oppositely disposed broaching cutters, of a pull bar for drawing a work piece between adjacent faces of the cutter, a feeding device for automatically delivering a work piece to said bar, means for preventing the delivery of a work piece after the pull bar has cleared the device, and means for receiving the work pieces ejected from the said bar, after clearing said cutters.

CARL J. HALBORG.